US 7,731,229 B2

(12) United States Patent
Song et al.

(10) Patent No.: US 7,731,229 B2
(45) Date of Patent: Jun. 8, 2010

(54) LOW RISK DEPLOYMENT PASSENGER AIRBAG SYSTEM WITH KNEE PROTECTION

(75) Inventors: Seung-Jae Song, Novi, MI (US); Jong Seop Nam, Commerce Township, MI (US)

(73) Assignee: CIS Tech, LLC, Novi, MI (US)

( * ) Notice: Subject to any disclaimer, the term of this patent is extended or adjusted under 35 U.S.C. 154(b) by 425 days.

(21) Appl. No.: 11/748,834

(22) Filed: May 15, 2007

(65) Prior Publication Data

US 2007/0210565 A1    Sep. 13, 2007

Related U.S. Application Data

(63) Continuation-in-part of application No. 11/531,483, filed on Sep. 13, 2006, which is a continuation-in-part of application No. 11/264,267, filed on Nov. 1, 2005, now Pat. No. 7,328,913.

(60) Provisional application No. 60/628,434, filed on Nov. 15, 2004.

(51) Int. Cl.
 *B60R 21/16* (2006.01)
(52) U.S. Cl. ..................................... 280/732
(58) Field of Classification Search .............. 280/728.2, 280/730.1, 732, 743.1, 752
See application file for complete search history.

(56) References Cited

U.S. PATENT DOCUMENTS

| 2,834,606 A | * | 5/1958 | Bertrand .................. 280/730.1 |
| 3,610,657 A | | 10/1971 | Cole |
| 3,642,303 A | | 2/1972 | Irish et al. |
| 3,664,682 A | | 5/1972 | Wycech |
| 3,767,225 A | | 10/1973 | Mazelsky |
| 3,768,830 A | * | 10/1973 | Hass ........................ 280/730.1 |

(Continued)

FOREIGN PATENT DOCUMENTS

DE    4304152    8/1993

(Continued)

OTHER PUBLICATIONS

USPTO Office Action mailed on Jun. 23, 2009 for co-pending U.S. Appl. No. 11/531,483, filed Sep. 13, 2006.

*Primary Examiner*—Paul N Dickson
*Assistant Examiner*—Robert A Coker
(74) *Attorney, Agent, or Firm*—Gifford, Krass, Sprinkle, Anderson & Citkowski, P.C.

(57) ABSTRACT

A passenger airbag system is designed for an automotive vehicle with a passenger compartment, a windshield and an instrument panel disposed between the passenger compartment and the windshield. The instrument panel has a top portion adjacent the windshield, a lower surface generally directed toward the legs of an occupant and a mid-portion with a surface that extends between the top and lower portions. The system includes a first airbag and a second airbag both disposed in the instrument panel. Each airbag has a cushion deployable from the housing through the instrument panel along a predetermined path for direct contact with an occupant seated in the passenger compartment. The second airbag has a lower portion when deployed that fills a space between the occupant's lower extremities and the lower portion of the instrument panel and thus acts as a knee airbag.

19 Claims, 12 Drawing Sheets

U.S. PATENT DOCUMENTS

| | | | |
|---|---|---|---|
| 3,778,083 A * | 12/1973 | Hamasaki | 280/739 |
| 3,784,225 A | 1/1974 | Fleck et al. | |
| 3,819,204 A | 6/1974 | Oka et al. | |
| 3,951,427 A * | 4/1976 | Wilfert | 280/732 |
| 4,043,572 A | 8/1977 | Hattori et al. | |
| 4,148,503 A | 4/1979 | Shiratori et al. | |
| 4,169,613 A | 10/1979 | Barnett | |
| 4,290,627 A | 9/1981 | Cumming et al. | |
| 4,300,894 A * | 11/1981 | Cumming et al. | 493/210 |
| 4,360,223 A | 11/1982 | Kirchoff | |
| 5,240,283 A | 8/1993 | Kishi et al. | |
| 5,310,214 A | 5/1994 | Cuevas | |
| 5,480,184 A | 1/1996 | Young | |
| 5,513,877 A | 5/1996 | MacBrien et al. | |
| 5,558,300 A | 9/1996 | Kalberer et al. | |
| 5,577,765 A | 11/1996 | Takeda et al. | |
| 5,752,715 A | 5/1998 | Pripps et al. | |
| 5,775,729 A | 7/1998 | Schneider et al. | |
| 5,775,730 A | 7/1998 | Pripps et al. | |
| 5,803,485 A | 9/1998 | Acker et al. | |
| 5,913,534 A | 6/1999 | Klingauf et al. | |
| 5,971,431 A * | 10/1999 | Wohllebe et al. | 280/732 |
| 6,059,312 A | 5/2000 | Staub et al. | |
| 6,065,771 A | 5/2000 | Kawakubo et al. | |
| 6,095,273 A | 8/2000 | Aboud et al. | |
| 6,158,765 A | 12/2000 | Sinnhuber et al. | |
| 6,209,908 B1 | 4/2001 | Zumpano | |
| 6,213,496 B1 | 4/2001 | Minami et al. | |
| 6,224,088 B1 | 5/2001 | Lohavanijaya | |
| 6,276,716 B1 | 8/2001 | Kato et al. | |
| 6,431,583 B1 | 8/2002 | Schneider | |
| 6,431,586 B1 | 8/2002 | Eyrainer et al. | |
| 6,471,242 B2 * | 10/2002 | Schneider | 280/732 |
| 6,505,851 B2 | 1/2003 | Frisch et al. | |
| 6,513,829 B1 | 2/2003 | Zumpano | |
| 6,523,855 B2 | 2/2003 | Musiol et al. | |
| 6,536,799 B2 | 3/2003 | Sinnhuber et al. | |
| 6,536,802 B1 * | 3/2003 | Sutherland et al. | 280/752 |
| 6,616,177 B2 | 9/2003 | Thomas et al. | |
| 6,676,147 B2 | 1/2004 | Ozaki et al. | |
| 6,679,522 B2 | 1/2004 | Igawa et al. | |
| 6,702,322 B2 | 3/2004 | Eyrainer et al. | |
| 6,709,009 B1 | 3/2004 | Michael et al. | |
| 6,836,715 B2 | 12/2004 | Sakai et al. | |
| 2002/0001774 A1 | 1/2002 | Je et al. | |
| 2002/0005633 A1 | 1/2002 | Amamori | |
| 2002/0020990 A1 | 2/2002 | Sinnhuber et al. | |
| 2002/0024200 A1 | 2/2002 | Eckert et al. | |
| 2002/0109341 A1 | 8/2002 | Eckert et al. | |
| 2002/0125690 A1 | 9/2002 | Boll et al. | |
| 2002/0185845 A1 | 12/2002 | Thomas et al. | |
| 2003/0015861 A1 * | 1/2003 | Abe | 280/730.1 |
| 2003/0030254 A1 | 2/2003 | Hasebe | |
| 2003/0034637 A1 | 2/2003 | Wang et al. | |
| 2003/0034638 A1 | 2/2003 | Yoshida | |
| 2003/0034639 A1 | 2/2003 | Amamori | |
| 2003/0094794 A1 | 5/2003 | Amamori | |
| 2003/0116945 A1 | 6/2003 | Abe | |
| 2003/0218319 A1 | 11/2003 | Amamori | |
| 2004/0026904 A1 | 2/2004 | Yamazaki et al. | |
| 2004/0026909 A1 | 2/2004 | Rensinghoff | |
| 2004/0046369 A1 | 3/2004 | Michael et al. | |
| 2004/0046370 A1 | 3/2004 | Reiter et al. | |
| 2004/0090050 A1 | 5/2004 | Dominissini et al. | |
| 2004/0100073 A1 | 5/2004 | Bakhsh et al. | |
| 2004/0100074 A1 | 5/2004 | Bakhsh et al. | |
| 2004/0124617 A1 * | 7/2004 | Morita | 280/732 |
| 2004/0201205 A1 | 10/2004 | Webber | |

FOREIGN PATENT DOCUMENTS

| | | |
|---|---|---|
| JP | 01132444 | 5/1989 |
| JP | 3112748 | 5/1991 |
| JP | 05139232 | 6/1993 |
| JP | 2000168486 | 6/2000 |

* cited by examiner

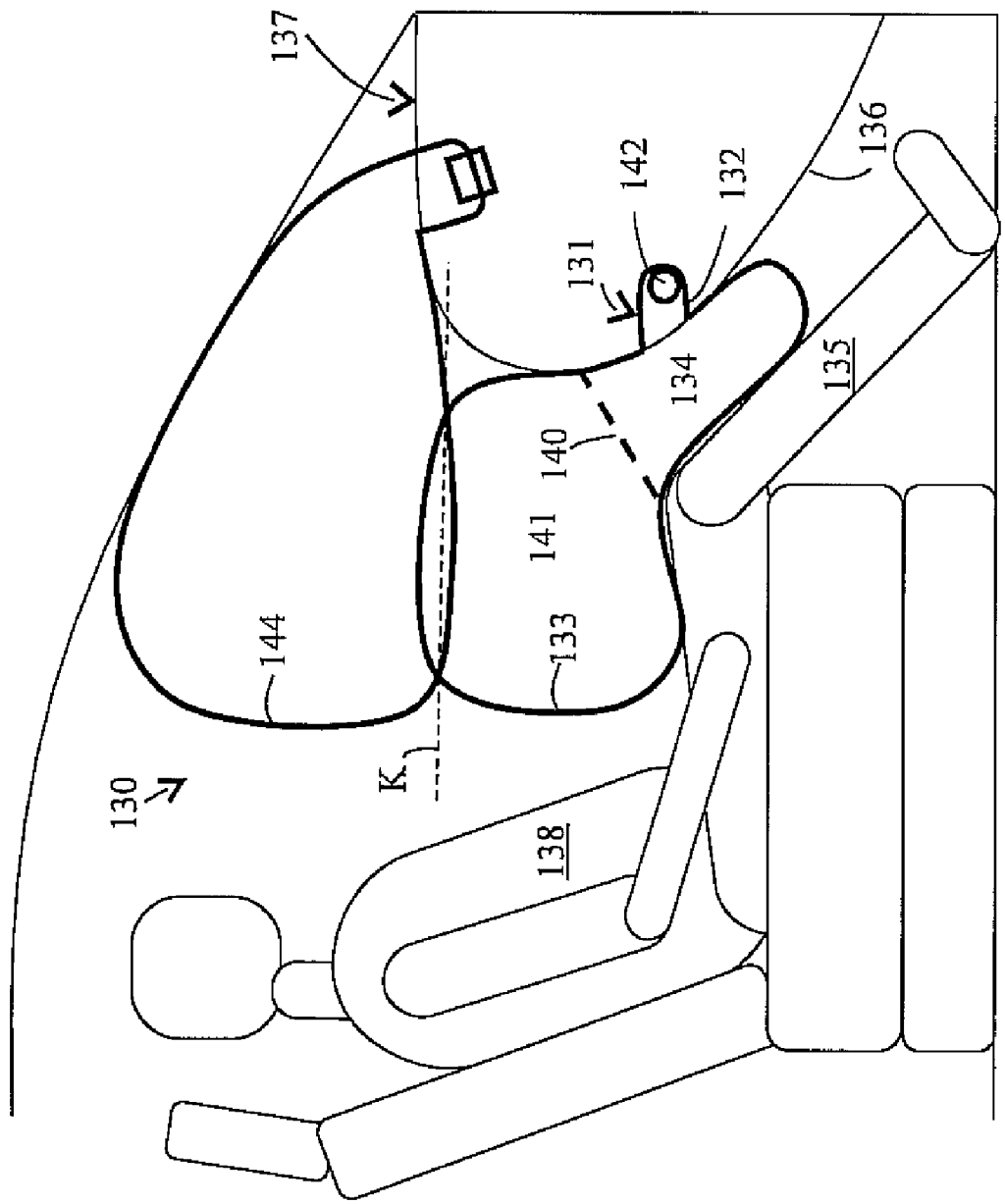

US 7,731,229 B2

LOW RISK DEPLOYMENT PASSENGER AIRBAG SYSTEM WITH KNEE PROTECTION

REFERENCE TO RELATED APPLICATIONS

This application is a continuation-in-part of U.S. patent application Ser. No. 11/531,483 filed Sep. 13, 2006, which is a continuation-in-part of U.S. patent application Ser. No. 11/264,267, filed Nov. 1, 2005, which claims benefit from U.S. Provisional Patent Application Ser. No. 60/628,434, filed Nov. 15, 2004, the entire contents of all of which are incorporated herein by reference.

FIELD OF THE INVENTION

This invention relates to a passenger airbag system including knee protection for use with a motor vehicle.

BACKGROUND OF THE INVENTION

The conventional passenger airbag modules are mounted at a single location on the instrument panel, i.e. top portion, mid (front) portion, or somewhere in between. When the airbag cushion deploys, an out-of-position occupant who is very close to the airbag module at the time of the inflation can have a high risk of injuries caused by the concentrated force generated by the cushion deployment from the single location.

SUMMARY OF THE INVENTION

An embodiment of the present invention provides a passenger airbag system for an automotive vehicle having a passenger compartment, a windshield, and an instrument panel disposed between the passenger compartment and windshield. The instrument panel has a top portion adjacent the windshield, a lower portion with a surface that is generally directed toward the legs of an occupant in the passenger compartment and a mid portion with a surface that extends between the top portion and the lower portion. The passenger airbag system includes a first airbag having a housing disposed in the instrument panel and an airbag cushion deployable from the housing thru the instrument panel along a predetermined path for direct contact with the head and torso of an adult occupant sitting in the passenger compartment. The system also includes a second airbag having a housing disposed in the instrument panel and an airbag cushion deployable from the housing through the instrument panel along a predetermined path for direct contact with an occupant seated in the passenger compartment. The second airbag cushion has an upper portion for contacting the torso of the occupant and a lower portion after deployment that at least partially fills a space between the occupant's lower extremities and the lower portion of the instrument panel. Further embodiments and alternatives are discussed herein below.

BRIEF DESCRIPTION OF THE DRAWINGS

Advantages of the present invention will be readily appreciated as the same becomes better understood by reference to the following description when considered in connection with the accompanying drawings, wherein:

FIG. 12 is a side view of yet another alternative embodiment of a passenger airbag system according to the present invention.

DETAILED DESCRIPTION OF THE INVENTION

Figure 1:
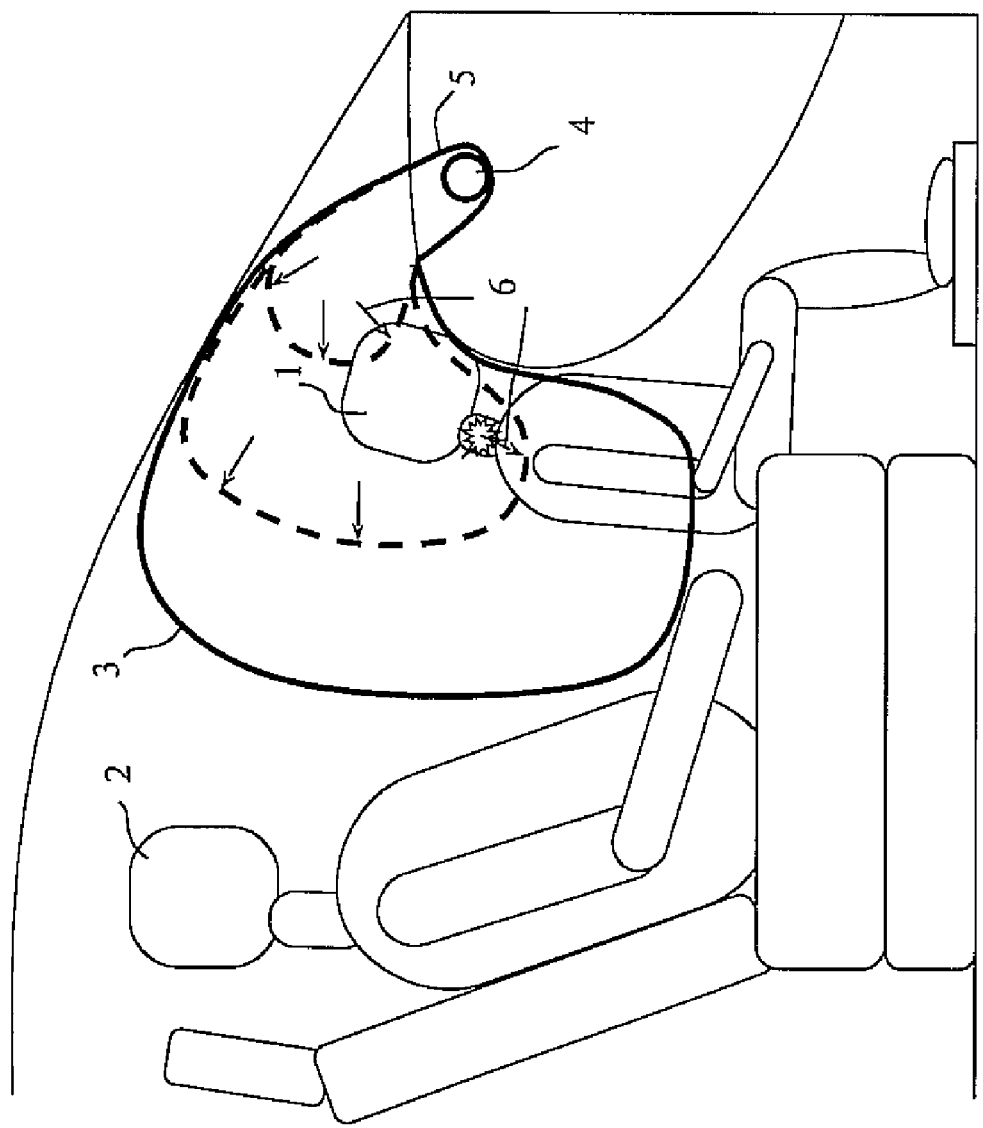
FIG. 1 is a side view of a conventional top-mounted passenger airbag with an out-of-position child dummy and an in-position adult dummy.

FIG. 1 shows a conventional passenger airbag module that is top-mounted in the instrument panel. The airbag cushion 3 deploys toward the head and torso areas of an adult occupant 2. During the airbag deployment, shown as dotted lines, the airbag can generate a substantially large component of downward deployment, as indicated by the arrows at 6. The component of downward deployment 6 can push the head of the out-of-position child 1 down and potentially cause a serious injury to the neck. The airbag module has a gas generating inflator 4, and a housing 5 that holds the inflator 4 and the airbag cushion 3.

Figure 2:
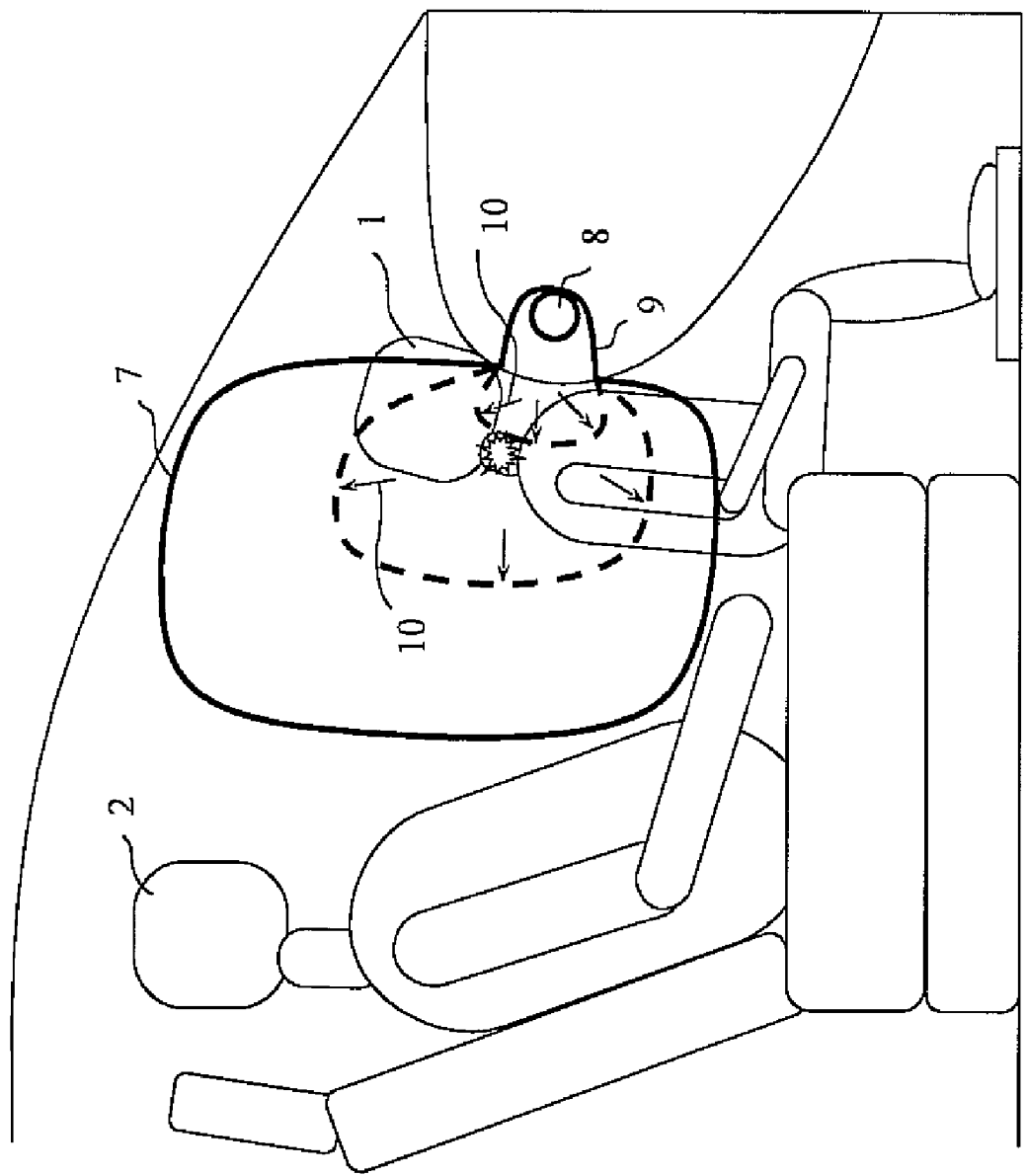
FIG. 2 is a side view of a conventional mid-mounted passenger airbag with an out-of-position child dummy and an in-position adult dummy.

FIG. 2 shows another conventional passenger airbag module that is mid-mounted in the instrument panel. The airbag module includes an airbag cushion 7, which deploys toward the head and torso areas of an adult occupant 2. During the airbag deployment, shown as dotted lines, the airbag 7 can generate a substantially large component of upward deployment, as indicated by the arrow 10, and can be trapped under the chin of an out-of-position child 1. The component of upward deployment 10 can push the chin up and potentially cause a serious injury to the neck. The airbag module also includes a gas generating inflator 8, and a housing 9 that holds the inflator 8 and the airbag cushion 7.

Figure 3:
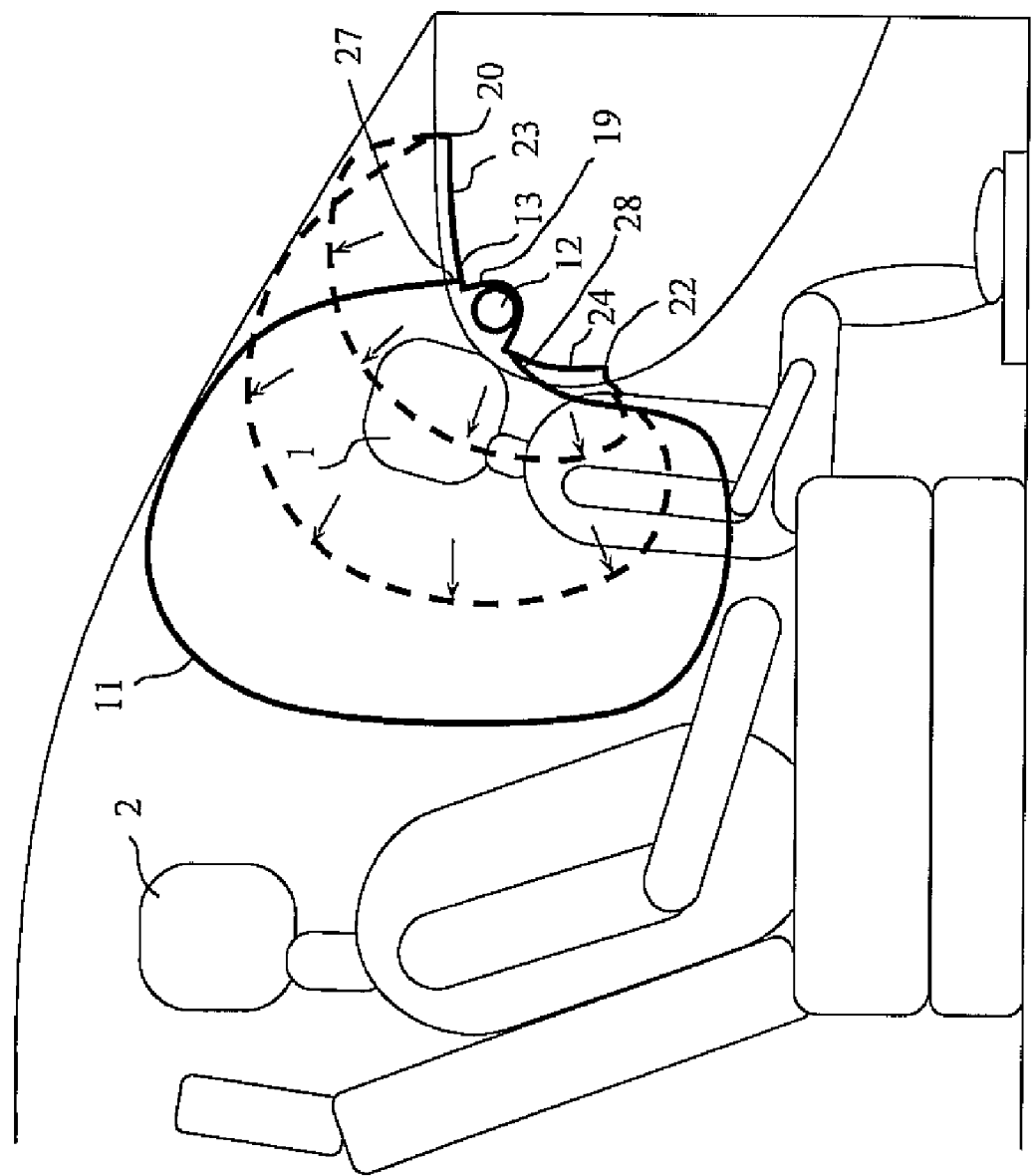
FIG. 3 is a side view of a passenger airbag according to one embodiment of the present invention with an out-of-position child dummy and an in-position adult dummy.

FIG. 3 shows a preferred embodiment of the present invention. The airbag system of the present invention generates a generally radial cushion deployment from the top portion to the mid (front) portion of the instrument panel, as shown by the dotted lines. This deployment mode can give two major benefits to out-of-position occupants. First, it provides a distributed force throughout the occupant body rather than a concentrated force that can be seen in conventional airbags, as shown in FIG. 1 and FIG. 2. The distributed force can lower the risk of injuries to out-of-position children and infants in child restraints. Second, the deployment mode is generally radial from the side view, approximately following the contour of the instrument panel. This radial deployment can reduce the risk of neck injuries significantly. In contrast, the deployment of conventional airbags has a substantial amount of risky downward or upward components near the neck area, as indicated by arrows in FIG. 1 and FIG. 2.

Figure 4:
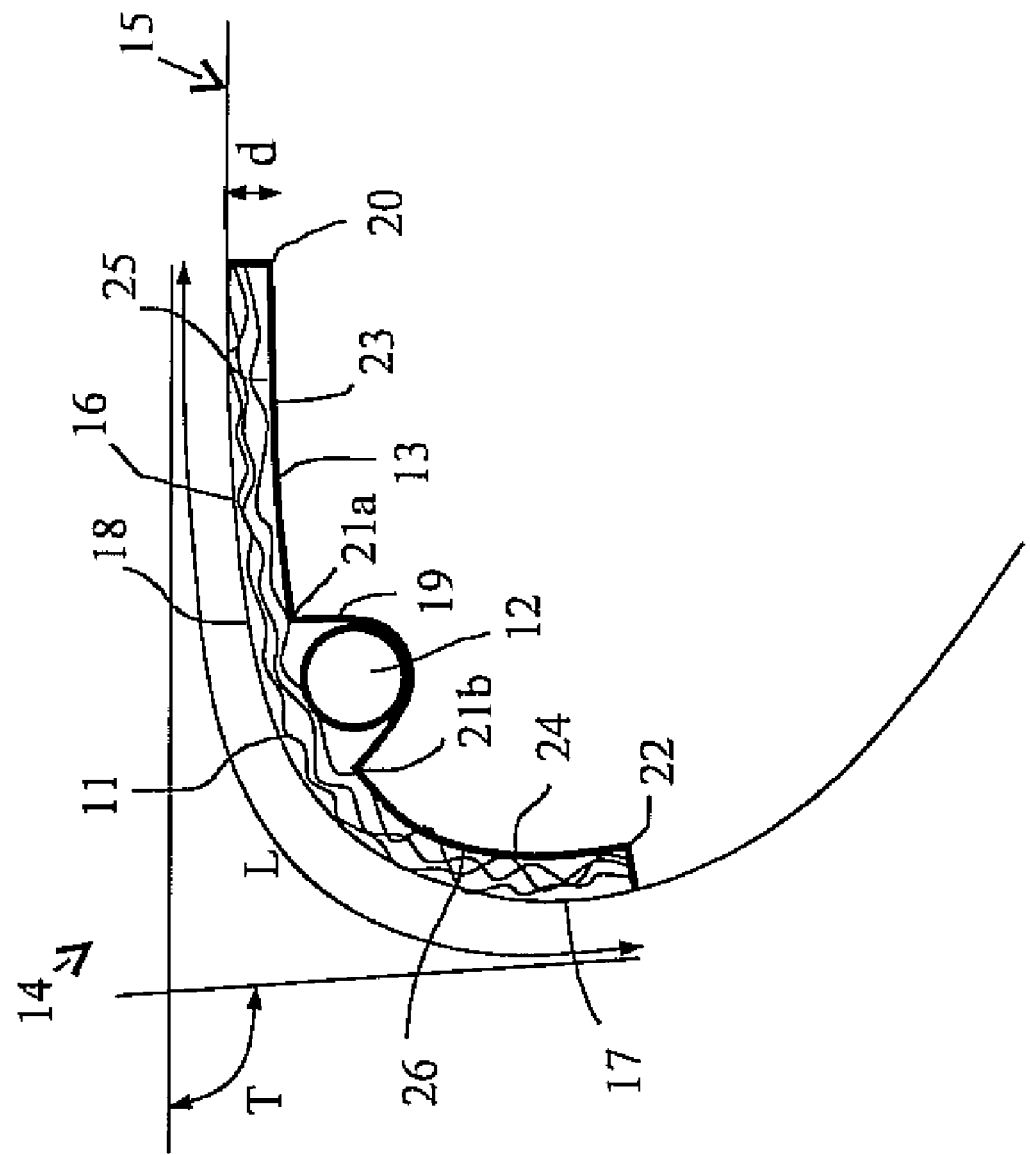
FIG. 4 is a side view of an embodiment according to the present invention in which the airbag housing extends from the conventional top-mounted airbag location to the conventional mid-mounted airbag location.

FIG. 4 shows a preferred embodiment of the present invention before the airbag cushion is deployed. The passenger airbag system 14 includes a gas generating inflator 12, an airbag cushion 11, and a housing 13 that contains the inflator 12 and the airbag cushion 11. In the present invention, the housing 13 extends from a top portion 16 of the instrument panel 15 to a mid or front portion 17 of the instrument panel as a single unit. The airbag cushion 11 is covered by an instrument panel skin 18. The length of the housing 13 of the present invention measured in the vehicle's longitudinal direction is substantially larger than the conventional airbag housing. It is large enough to cover a substantial amount of both the top and the mid portions of the instrument panel. The length should be larger than the conventional airbag housings. The length can be at least twice as large as that of conventional airbag housings in order to cover the location of a conventional top-mounted airbag and the location of a conventional mid-mounded airbag. For example, in some embodiments, the length L is at least 6 inches, while in further embodiments the length is at least 10 inches. It should be noted that the length L is measured generally in the longitudinal direction along the surface 18 of the instrument panel and therefore may be along the curved or an angled surface. The maximum length L is limited by functional considerations and by the size and shape of the instrument panel. A practical upper limit is 30 inches. One preferred length is in the range of 12-20 inches.

As used herein and shown in FIG. 13, the top of the instrument panel may mean the portion of the instrument panel with a surface that is generally more horizontal than vertical and generally faces the windshield. Alternatively, the top portion may be the portion of the instrument panel that is adjacent the windshield, even if the surface is not more horizontal than vertical. The instrument panel 83 may also be said to have a lower portion 87 which has a surface that is generally directly downwardly and toward the occupant's lower extremities. The instrument panel 83 further has a mid portion 88 which, for definitional purposes, is the portion that extends between the top portion 86 and the lower portion 87. The mid portion may also be defined as the portion of the instrument panel adjacent to and/or extending away from the top portion. This mid portion includes the portion that is more vertical than horizontal and directed toward the occupants as well as the portion that is traditionally referred to as a ¾ (three quarter) portion or area. The ¾ (three quarter) portion or area has a surface which may be more vertical than horizontal, may be more horizontal than vertical, or in between. The surface angle depends on the design and style of the instrument panel being used. As shown in FIGS. 3 and 4, the airbag housing 13 has a pair of opposed edges 20 and 22 that are spaced apart by the length L. In this embodiment, the inflator 12 is positioned approximately midway between the opposed ends 20 and 22 in a recessed area 19. The recessed area 19 has a pair of opposed edges 21a and 21b, as best shown in FIG. 4. The airbag cushion 11 has a pair of edges 27 and 28 that join the airbag housing 13. In the embodiment of FIG. 3, these edges are interconnected with the housing adjacent the edges 21a and 21b of the recessed area 19. These edges 27 and 28 define an opening through which gas flows from the inflator 12 into the cushion 11. These edges 27 and 28 are positioned substantially inboard from the edges 20 and 22 of the airbag housing 13. A preferred inflation pattern for the airbag cushion 11 is shown in the dashed lines in FIG. 3. As shown, as the cushion initially inflates, it unfolds and expands radially from the airbag housing 13, as shown by the innermost dashed line. As the cushion 11 continues to inflate, as shown by the second dashed line and the solid line, the portion of the airbag laying in the airbag housing adjacent the edges 20 and 22 of the housing 13, moves generally radially away from the airbag housing until it takes the shape shown in the solid line of FIG. 3.

Figure 5:
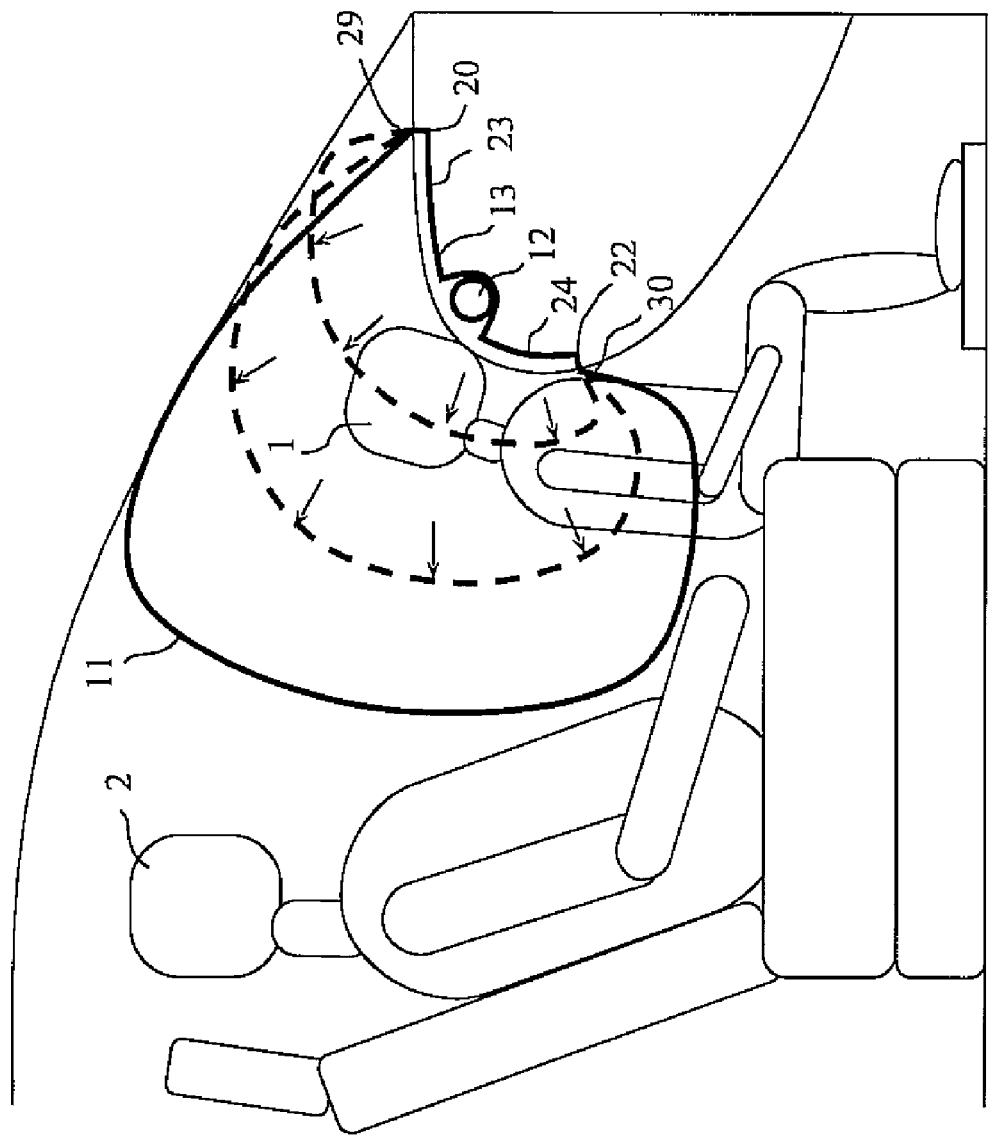
FIG. 5 is a side view of another embodiment of the passenger airbag according to the present invention with an out-of-position child dummy and an in-position adult dummy.

Referring now to FIG. 5, an alternative version of an airbag cushion 11 is shown which has opposed edges 29 and 30 that are interconnected or adjacent to the opposed edges 20 and 22 of the housing 13. As such, these edges 29 and 30, which define an opening for allowing gas from the inflator to enter the cushion 11, are spaced apart by a substantial distance, similar to the length L. As will be clear to those of skill in the art, cushion material may also be interconnected with other portions of the housing. Referring again to FIG. 5, the first edge 29 is connected with the housing 13 on the top of the instrument panel while the second edge 30 is connected with the housing 13 on the front or mid-portion of the instrument panel and the two edges are spaced apart by a distance similar to the length L in FIG. 4. That is, the edges may be spaced apart by at least 6 inches, or at least 10 inches or more.

Referring to FIGS. 3-5, the housing 13 of the airbag system is preferably curved so as to follow the contours of the instrument panel. It may be said to have a top portion 23 disposed in the top of the instrument panel and a front or mid-portion 24 disposed in the front or mid-portion of the instrument panel. The top portion 23 and the mid or front portion 24 may be both said to have cushion-receiving faces 25 and 26, respectively, as shown in FIG. 4. In the embodiment of FIG. 4, the top portion 23 of the housing 13 is generally horizontal while the mid or front portion 24 is generally vertical. Preferably, these portions are angled with respect to each other with an angle T of at least 30 degrees, with at least 45 degrees being more preferred and, for some versions, at least 60 degrees being most preferred. The angles referred to may be considered to be the angle between the faces 25 and 26 immediately adjacent the edges 20 and 22. In the embodiment of FIG. 4, the angle T between the surfaces 25 and 26 is greater than 90 degrees.

An upper limit for the angle T is constrained by functional considerations and the design of the instrument panel. It is unlikely that such considerations would allow the angle T to be as large as 180 degrees. A practical upper limit is probably 120 degrees. In the illustrated embodiments, the housing 13 is smoothly curved between the edges 20 and 22. Alternatively, the housing may have an angle or bend to follow the contours of an instrument panel, such that it has one or more generally planar portions. Again, it is preferred that the cushion-receiving surfaces adjacent the end portions be angled with respect to each other. In the illustrated embodiments, the cushion-receiving surface is generally parallel to the surface of the instrument panel. Alternatively, the surfaces may not be parallel. In this case, the discussion of angles above may apply to the instrument panel surface. That is, the instrument panel surface immediately adjacent one edge of the airbag housing may be at an angle to the surface immediately adjacent the opposite edge. The angle may be at least 30 degrees, with at least 45 degrees being more preferred.

Referring again to FIGS. 3-5, it can be seen that the top portion 23 of the airbag housing 13 is generally larger than the front or mid-portion 24. This is a preferred configuration.

Even though the width of the airbag housing 13 of this embodiment of the present invention is preferred to remain about the same as the conventional airbag housing, it can be enlarged from the conventional size in order to further distribute the airbag cushion over the instrument panel. For a given width, the depth measured in a perpendicular direction to the instrument panel surface should decrease as the length increases in order to keep the housing volume the same as the conventional airbag. The airbag cushion, when fully deployed, preferably has about the same shape and volume as a conventional airbag cushion.

Figure 6:
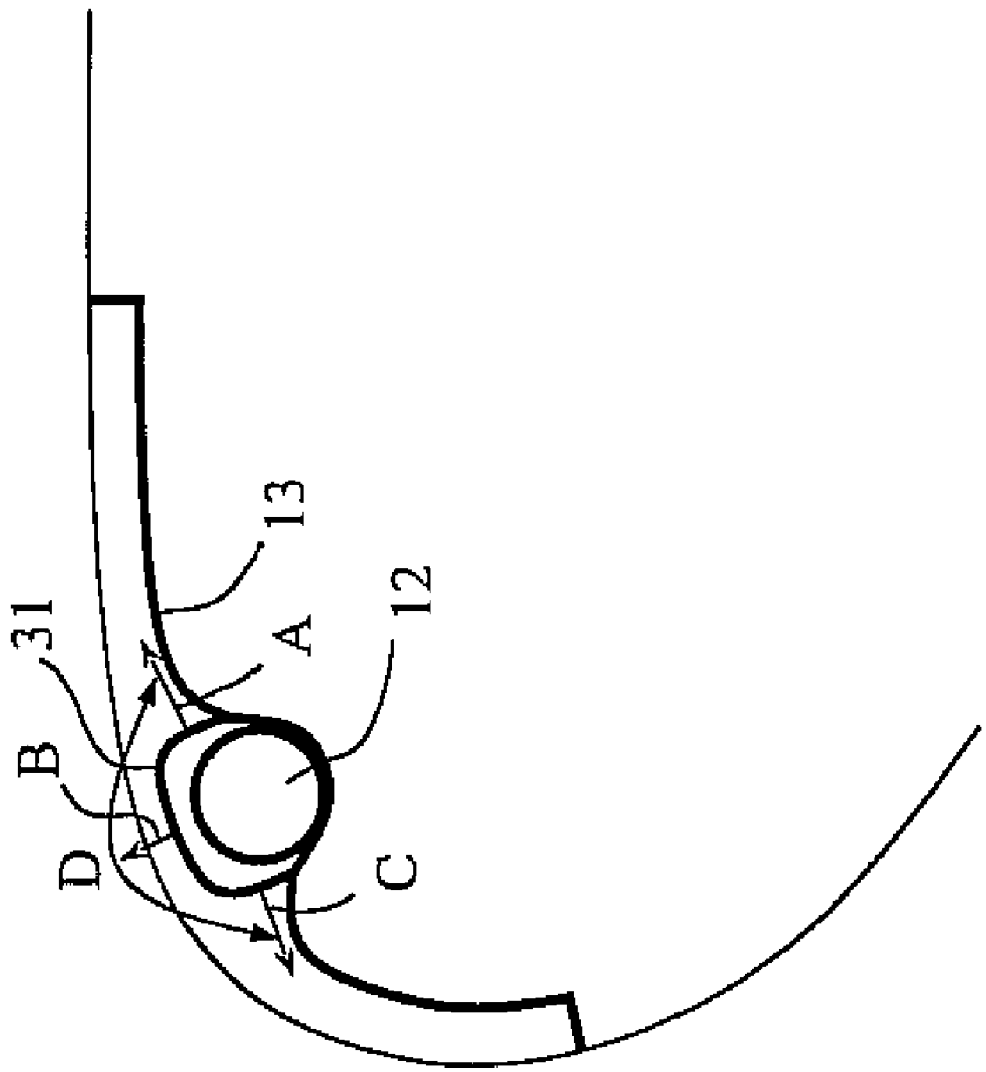
FIG. 6 is a side view of another embodiment according to the present invention in which a diffuser of the present invention is used.

Though not shown in FIG. 4, a diffuser may be provided between the inflator 12 and the airbag cushion 11. FIG. 6 shows a preferred embodiment of a diffuser of the present invention. The inflator 12 can be located anywhere within the airbag module, though the center is a preferred location. Because of the long housing, the gas generated from the inflator may build up higher pressure near the inflator and lower pressure away from the inflator, which can generate undesirable cushion deployment. In order to avoid this problem, the diffuser 31 of the present invention has several surfaces with opening holes that aim different directions in order to control the way the airbag cushion is deployed. The diffuser of the present invention can help control the amount of gas flow generated by the gas generating inflator 12 in such a way that the airbag cushion can deploy in the intended manner of uniform and radial shape. The diffuser 31, if included, may have a variety of shapes and sizes, and may have holes or openings provided therein in a variety of arrangements. It is preferred that the diffuser 31 directs gas in at least three directions, as shown by arrows A, B and C in FIG. 6. It is also preferred that some of the gas flows are directed in generally opposed directions, as shown by arrows A and C. The angle between these gas flows A and C is shown as D as preferably greater than 90 degrees, with greater than 120 degrees being more preferred, and greater than 150 degrees being even more preferred. In some embodiments, the angle D is at least 150 degrees, and may be as much as 180 degrees or more. As a practical upper limit, the angle D should not be more than 270 degrees. The direction of each of the arrows A-C may be defined as being generally perpendicular to the surface of the diffuser 31 where the diffuser openings are located.

Figure 7:
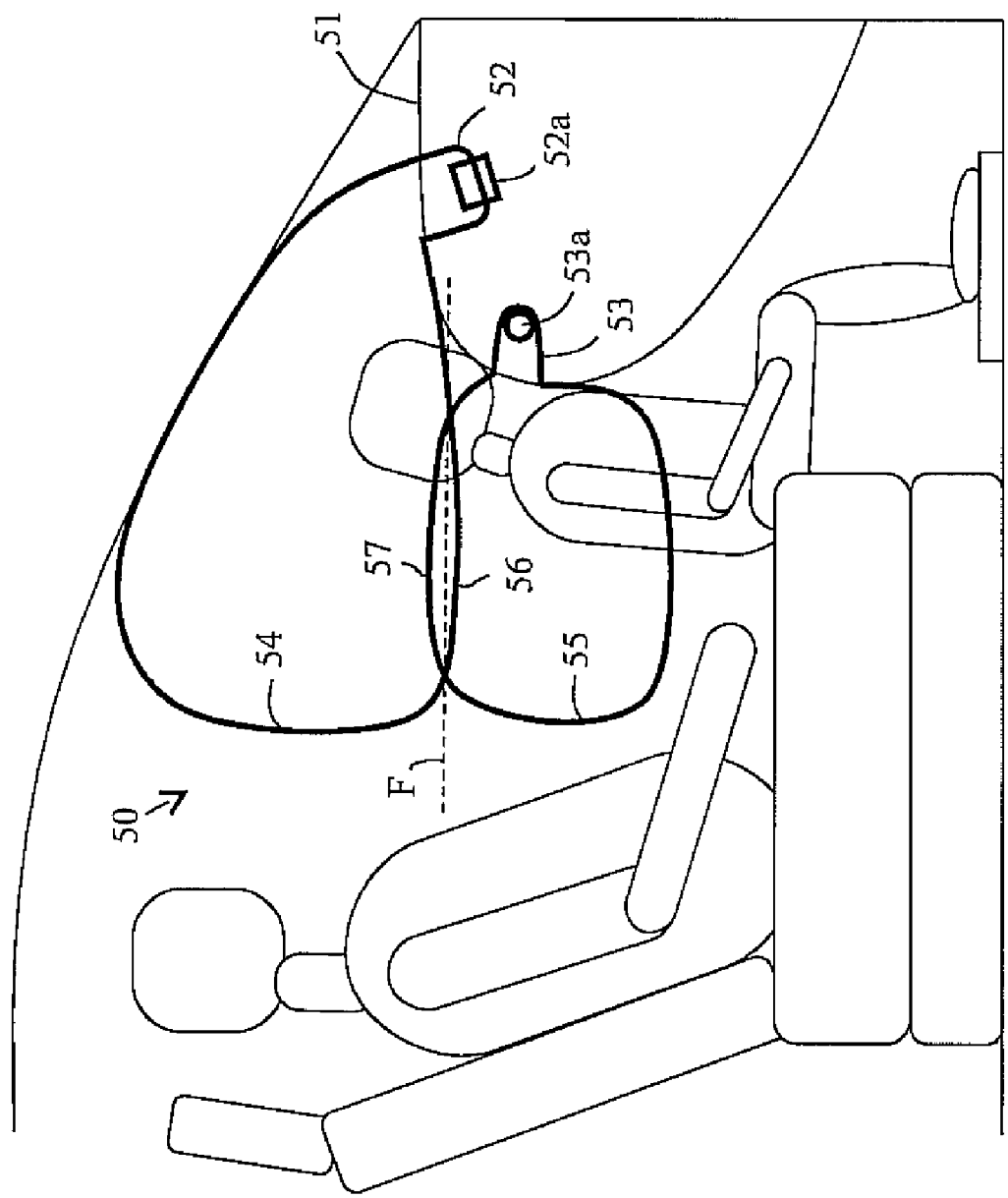
FIG. 7 is a side view of another embodiment of a passenger airbag system according to the present invention.

Referring now to FIG. 7, an alternative embodiment of an airbag system according to the present invention is generally shown at 50. The airbag system is disposed in the instrument panel 51 and includes a top-mounted airbag housing 52 and a mid or front mounted airbag housing 53. A top-mounted airbag cushion 54 and a front mounted airbag cushion 55 are both deployable through the instrument panel 51. Both airbag cushions 54 and 55 are deployable along a predetermined path for direct contact with the occupant. Preferably, the predetermined path is generally horizontal. The top-mounted airbag cushion 54 deploys both obliquely along the windshield and horizontally towards the occupant, but preferably lacks a downward directional component relative to the occupant, which is a risky component to the neck of an out-of-position occupant and to the face of an infant riding in a rear facing child seat. The mid or front mounted airbag cushion 55 may deploy along both a generally horizontal and downward path towards the occupant, but preferably lacks any substantial upward deployment direction, which is a risky component to the neck of an out-of-position occupant.

As shown, when the airbag cushions 54 and 55 are both deployed, they together define a shape similar to the larger airbag of the earlier embodiments. The top-mounted airbag is deployed above the mid-mounted airbag cushion 55 and the top-mounted airbag cushion 54 has a substantially larger volume to serve as a main airbag protecting the head and upper torso of the in-position occupant while the mid-mounted airbag serves as a supporting airbag protecting the lower torso of the in-position occupant and keeping the top-mounted airbag from dropping and/or skewing during the deployment and cushioning. In some embodiments, the top-mounted airbag cushion has a deployed volume at least 25% greater than the mid-mounted airbag cushion 55, while in other embodiments, the top-mounted airbag cushion has a volume at least 50% greater than the mid-mounted airbag cushion 55. The top-mounted airbag cushion 54 may have a deployed volume in the range of 60 to 120 liters, while the mid-mounted airbag cushion may have a volume range of between 30 and 70 liters. Other sizes may also be used.

Preferably, the two airbag cushions 54 and 55 have separate inflators, though a single inflator may be used to provide gas to both airbag cushions through some type of channel or opening. The top-mounted housing 61 may use a driver airbag inflator 52*a* with a proper adjustment of mechanical properties such as pressure and fill-time and the mid-mounted housing 62 may use a side curtain airbag inflator 53*a* with a proper adjustment. As shown in FIG. 7, the two airbag cushions 54 and 55 may come close to or contact each other at the end of the deployment stage generally along a line indicated at F. This line of contact F is preferably generally horizontal, though may be angled with respect to horizontal by up to plus or minus 30 degrees. It is more preferred that the line be angled by between plus and minus 20 degrees and more preferred that it be angled plus or minus 10 degrees. It is also preferred that the line of contact F be at an angle less than the windshield angle such that it is not parallel to the windshield. In some versions, it may be an angle no greater than the windshield angle minus 5 degrees. For example, if a vehicle had a windshield with a 32 degree angle, it is preferred that the line of contract be angled no more than 27 degrees towards the windshield, though it could be angled downwardly away from the windshield within the limits stated above. For definitional purposes, the upper airbag cushion 54 may be said to have a lower surface 56, while the lower airbag cushion 55 may be said to have an upper surface 57. These surfaces may be generally adjacent and/or parallel to one another, and each may be generally adjacent and/or parallel to the line F. Preferably, both surfaces are generally horizontal, but may be angled in the range or plus or minus 30 degrees, more preferably plus or minus 20 degrees or most preferably plus or minus 10 degrees. The horizontal is generally considered to be the optimal angle as it best suits both for protecting in-position occupants and for reducing the risk of injuries caused by airbag inflation to the out-of-position occupant and the infant sitting in a rear facing child seat. Further aspects of this version of the present invention will be clear to those of skill in the art based on review of Applicants' U.S. Pat. No. 7,070, 201, the entire contents of which is incorporated herein by reference. Any of the teachings of Applicants' patent may be combined with the teachings of the present disclosure.

Figure 8:
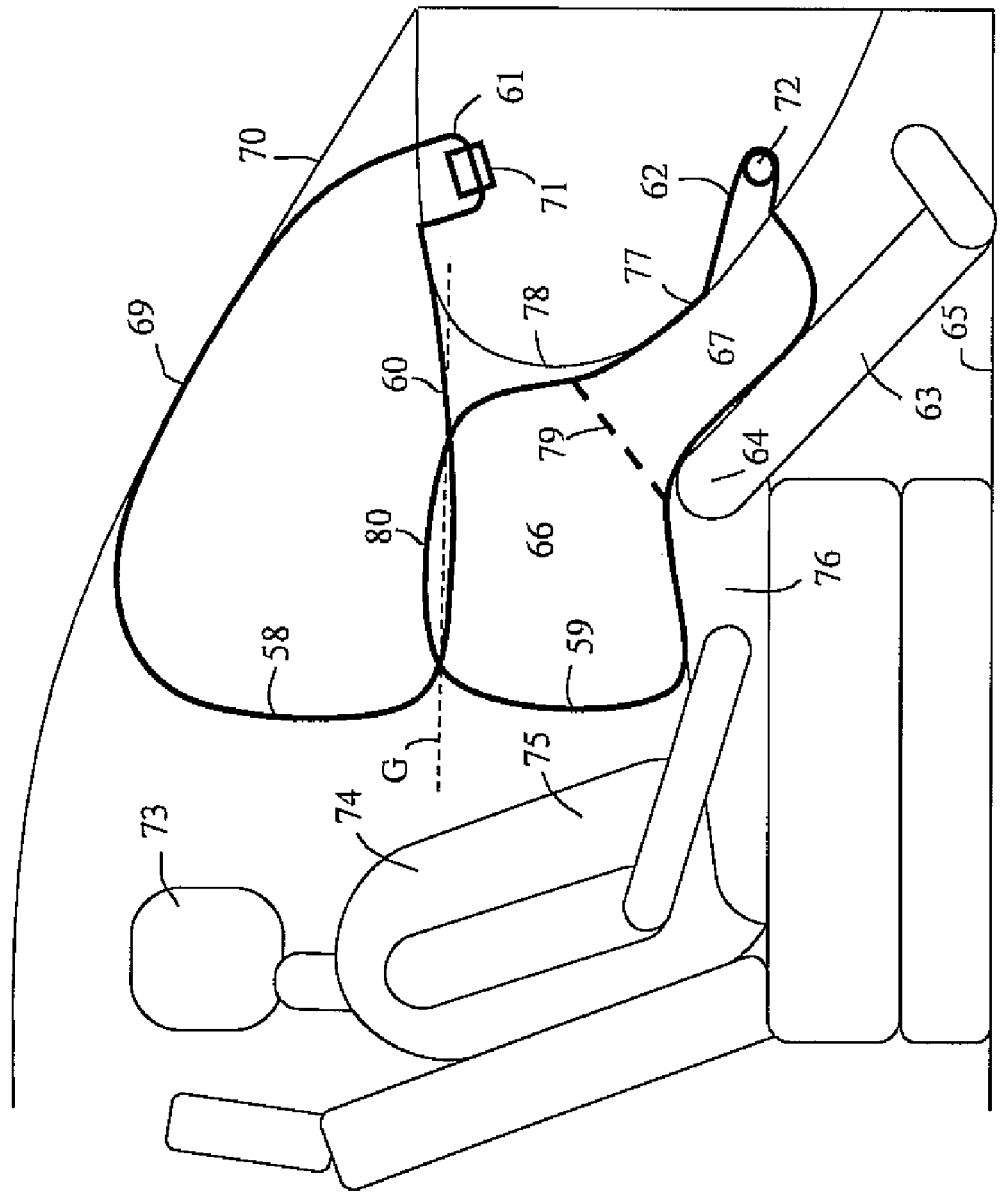
FIG. 8 is a side view of yet another embodiment of a passenger airbag system according to the present invention.

FIG. 8 shows another alternative embodiment of an airbag system according to the present invention. The top-mounted housing 61 is mounted on the top portion of the instrument panel and may use a driver airbag inflator 71 with a proper pressure and fill-time adjustment. It deploys obliquely upward along the windshield 70 creating an upper cushion surface 69 after deployment, and deploys horizontally creating a lower cushion surface 60. This top-mounted airbag basically has the same features and benefits as the one shown in FIG. 7.

The low-mounted airbag housing 62 is mounted on the instrument panel below the level of the adult occupant's knees, preferably in the glove box area as a single unit or in a space below the glove box. For definitional purposes, the low-mounted airbag may be said to be disposed in a lower portion of the instrument panel below the mid-portion. The lower portion has a surface that is generally directed toward the occupant's lower extremities such as knees, lower legs, and feet. A side curtain airbag inflator 72 may be used with a proper adjustment if it has an enough capacity to fill the volume of the low-mounted airbag cushion. The cushion 59 first deploys into the space between the occupant's lower legs 63 and the lower portion of the instrument panel 77, and forms a cushion volume 67. The cushion 59 further travels and gets positioned into the open space created by four boundaries, namely the lower torso 75, the lower cushion surface of the top-mounted airbag 60, the mid or front portion of the instrument panel 78, and the upper legs 76, and forms a cushion volume 66 with an upper surface 80.

The lower part 67 of the cushion 59 serves to protect the occupant's knees 64, lower legs 63, and upper legs (femurs) 76. The upper part 66 serves to protect the occupant's lower torso 75 and supports the top-mounted airbag cushion 58 from falling and/or skewing during the deployment and cushioning. The airbag cushion 59 can be made of two chambers, as an alternative, in which the air flow is restricted by a membrane 79 through which the generated gas flows from the lower part 67 to upper part 66. This two chamber construction can help increase the pressure built up in the lower part 67 during the cushioning and help absorb more energy.

As shown in FIG. 8, the two airbag cushions 58 and 59 may come close to or contact each other at the end of the deployment stage generally along a line indicated at G. This line of contact G is preferably generally horizontal, though may be angled with respect to horizontal by up to plus or minus 30 degrees. It is more preferred that the line be angled by between plus and minus 20 degrees and more preferred that it be angled between plus and minus 10 degrees. As with line F, it is also preferred that the line of contact G be at an angle less than the windshield angle such that it is not parallel to the windshield. In some versions, it may be an angle no greater than the windshield angle minus 5 degrees. For example, if a vehicle had a windshield with a 32 degree angle, it is preferred that the line of contract be angled no more than 27 degrees towards the windshield, though it could be angled downwardly away from the windshield within the limits stated above. For definitional purposes, the upper airbag cushion 58 may be said to have a lower surface 60, while the lower airbag cushion 59 may be said to have an upper surface 80. These surfaces may be generally adjacent and/or parallel to one another, and each may be generally adjacent and/or parallel to the line G. Preferably, both surfaces are generally horizontal, but may be angled in the range of plus or minus 30 degrees, more preferably plus or minus 20 degrees or most preferably plus or minus 10 degrees. The horizontal is generally considered to be the optimal angle as it best suites both for protecting in-position occupants and for reducing the risk of injuries caused by airbag inflation to the out-of-position occupant and the infant sitting in a rear facing child seat. The upward directional component of the low-mounted airbag cushion 59 during the early stage of cushion deployment may not be risky to the neck of the out-of-position occupant as the inflator is located far away from the neck area.

The top-mounted airbag preferably serves as a main airbag. It protects the occupant's head and upper torso which are the major human body parts whose injuries can lead to fatality. The occupant's lower extremities body such as the lower torso and legs are protected by knee bolster as well as the lower-mounted airbag. The knee bolster is an energy absorbing structure that is installed in the lower portion of the instrument panel and contacts primarily with the knees during a frontal crash event. The volume of the top-mounted airbag can range from 60 to 120 liters. The volume of the upper part 66 of the low-mounted airbag that is sitting above the occupant's upper legs can range from 30 to 70 liters. The volume of the lower part 67 of the low-mounted airbag that protects the knees and lower legs can range from 10 to 30 liters. It is preferred that the top-mounted airbag is larger than the upper part 66 of the low-mounted airbag. In some embodiments it can be at least 25% larger, or in other embodiments it can be at least 50% larger.

Figure 9:
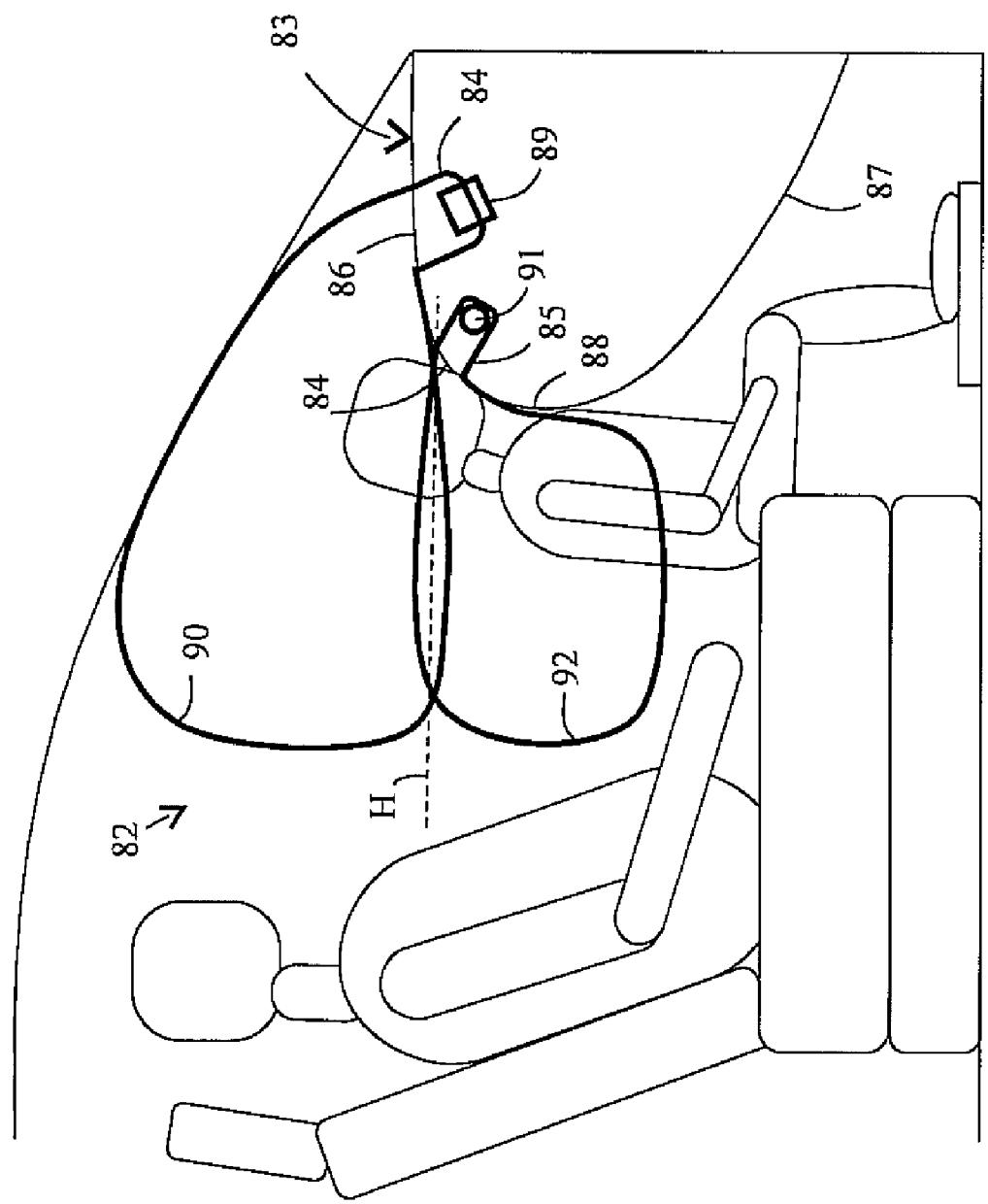
FIG. 9 is a side view of a further embodiment of a passenger airbag system according to the present invention.

Referring now to FIG. 9 another alternative embodiment of an airbag system according to the present invention is shown generally at 82. The airbag system is disposed in the instrument panel 83 and includes a top-mounted airbag housing 84 and a mid or ¾ (three-quarter) mounted airbag housing 85. An airbag cushion is deployable from each housing along a predetermined path, thru the instrument panel, for direct contact with an occupant. Preferably, the predetermined path is generally horizontal.

The instrument panel 83 may be said to have a top portion 86 with a surface that is more horizontal than vertical and generally directed toward the windshield. Alternatively, the top portion may be the portion of the instrument panel that is adjacent the windshield, even if the surface is not more horizontal than vertical. The instrument panel 83 may also be said to have a lower portion 87 which has a surface that is generally directly downwardly and toward the occupant's lower extremities. The instrument panel 83 further has a mid portion 88 which, for definitional purposes, is the portion that extends between the top portion 86 and the lower portion 87. The mid portion may also be defined as the portion of the instrument panel adjacent to and/or extending away from the top portion. This mid portion includes the portion that is more vertical than horizontal and directed toward the occupants as well as the portion that is traditionally referred to as a ¾ (three quarter) portion or area. The airbag housing 85 is ¾ (three quarter) mounted, which is considered to be mid mounted for purposes of this invention. The ¾ (three quarter) portion or area has a surface which may be more vertical than horizontal, may be more horizontal than vertical, or in between. The surface angle depends on the design and style of the instrument panel being used. The ¾ (three quarter) location may be preferred when there are other parts such as a glove box, a tie-bar, and/or an air duct that can interfere with the more vertical section of the mid portion of the instrument panel 83.

The top-mounted airbag housing 84 includes an inflator 89 that deploys the top mounted airbag cushion 90. The top mounted airbag basically has the same features and benefits as the one shown in FIG. 7. For example, the top-mounted airbag cushion preferably deploys both obliquely along the windshield and horizontally toward the occupant, but substantially lacks a downward directional component relative to the occupant.

The mid or ¾ mounted airbag housing 85 includes an inflator 91 that deploys the mid mounted airbag cushion 92. The mid mounted airbag basically has the same features and benefits as the mid-mounted airbag shown in FIG. 7. The mid mounted airbag cushion 92 deploys either obliquely or horizontally toward an open space below the top-mounted airbag cushion depending on the design angle of the housing 85. The volume of the top-mounted airbag cushion after deployment is substantially larger than that of the mid or ¾ mounted airbag cushion after deployment. The relative sizes and absolute sizes of the top and mid mounted airbag cushions are preferably in accordance with the values provided for the design of FIG. 7. The functional relationship between the top and mid mounted airbag cushions in FIG. 9 are also preferably in accordance with the relationship described for the airbags of FIG. 7. For example, the lower surface of the top mounted airbag cushion 90 and the upper surface of the mid mounted airbag cushion 92 preferably come close to or contact each other along a line of contact H when deployed. The angular limitations described for the line of contact and the upper and lower surfaces of the airbag cushions in FIG. 7 preferably also apply to the airbags of FIG. 9. It should also be noted that both the top and mid mounted airbag cushions are designed for direct contact with the head or torso of an occupant properly positioned in the passenger compartment. Neither is designed for contact with the lower extremities of the occupant.

Figure 10:
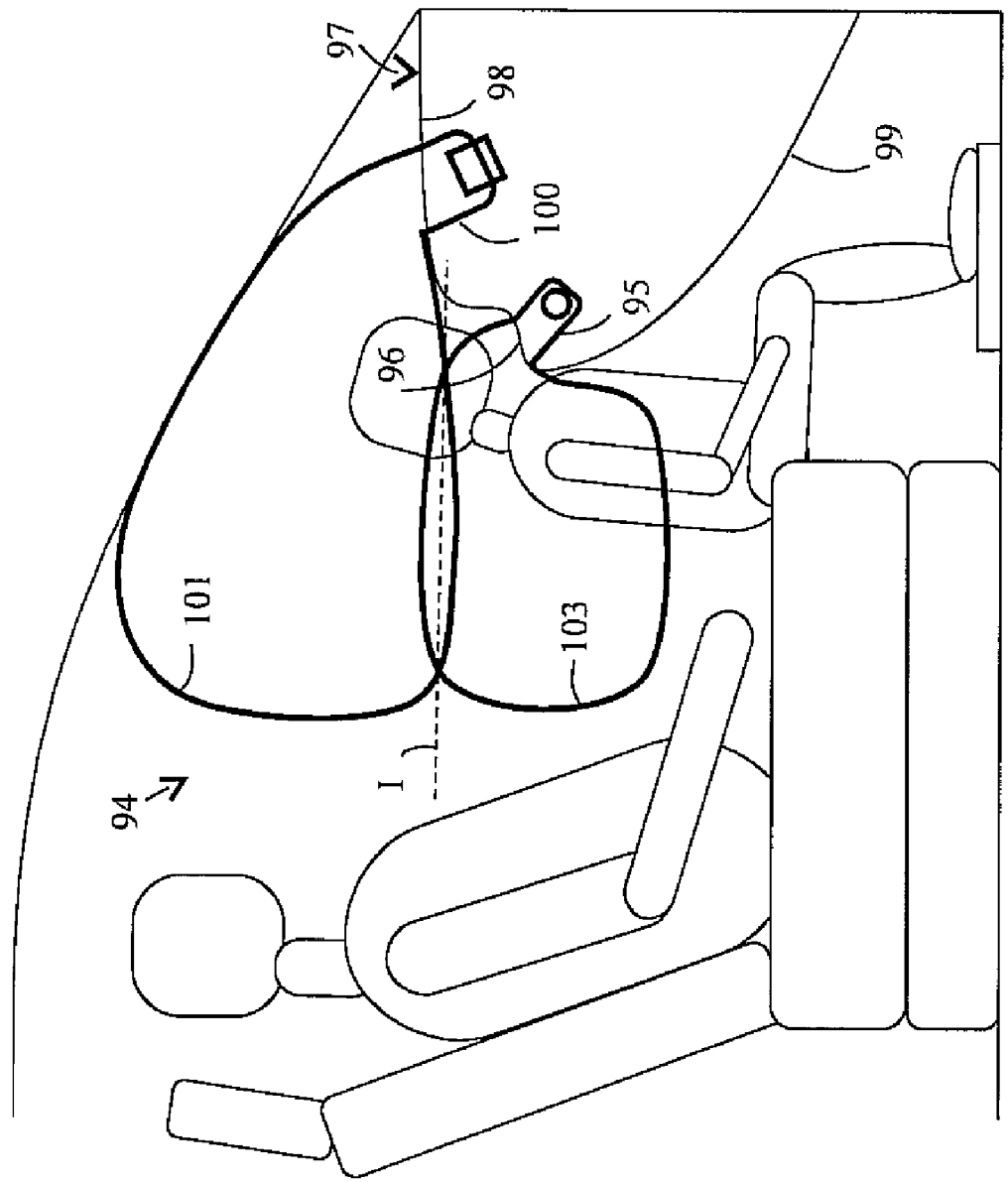
FIG. 10 is a side view of an additional embodiment of a passenger airbag system according to the present invention.

FIG. 10 shows yet another alternative embodiment of an airbag system 94 according to the present invention. The system 94 is similar to the system of FIG. 9 except that the mid mounted airbag housing 95 is mounted lower and closer to the passenger. The mid portion 96 of the instrument panel 97 is next to and below the top portion 98 and above the lower portion 99. The surface of the instrument panel 97 where the mid-mounted airbag housing 95 is located may or may not be more vertical than horizontal. The angle depends on the design and style of the instrument panel being used. The top mounted airbag housing 100 deploys the top mounted airbag cushion 101 and the mid mounted airbag housing 95 deploys the mid mounted airbag cushion 103. The airbag cushions 101 and 103 have the same features and benefits as the airbag cushions shown in FIGS. 11 and 13, and the same considerations apply with respect to sizes, surface angles and the angle of the line of contract I. The mid mounted airbag cushion 103 deploys either obliquely or horizontally toward an open space below the top-mounted airbag cushion depending on the design angle of the housing 95.

Figure 11:
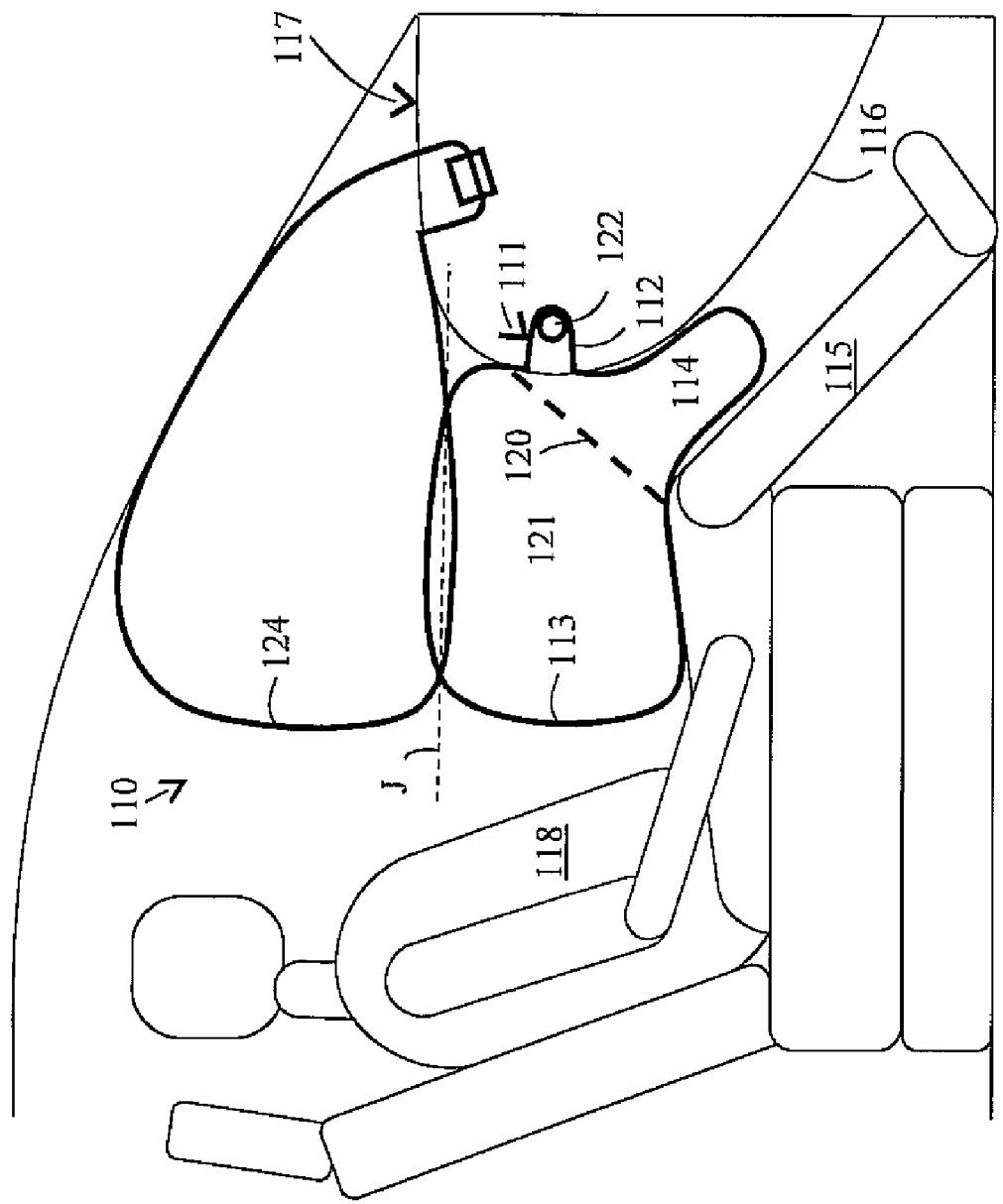
FIG. 11 is a side view of another alternative embodiment of a passenger airbag system according to the present invention.

FIG. 11 shows a further alternative embodiment of an airbag system 110 according to the present invention. This embodiment has basically the same features and benefits as the one shown in FIG. 8. The difference is that the second airbag shown in FIG. 8 is now mounted at or near the mid portion of the instrument panel. The mid mounted airbag 111 has a housing 112 mounted in the mid portion of the instrument panel and deploys an airbag cushion 113 for direct contact with the torso of the occupant. However, the airbag cushion 113 has an additional lower portion 114 which deploys into the empty space between the front of the occupant's lower legs 115 and the lower portion 116 of the instrument panel 117. As such, the airbag cushion 113 deploys into two empty spaces, one located in front of the occupant's lower torso 118 and the other in front of the occupant's lower legs 115. The airbag cushion 113 preferrably includes a tether or membrane 120 that partially restricts gas flow from the lower portion 114 of the cushion 113 into the upper portion of the cushion 121. As shown, it is preferred that the inflator 122 be in fluid communication with portion of the airbag cushion 113 on the side of the membrane 120 closest to the lower portion 114. This can help the lower portion 114 of the cushion 113 deploy faster than the upper portion 121 of the cushion so that the lower portion can quickly deploy into the area in front of the occupant's lower legs before the gap between the lower legs and the lower part of the instrument panel surface closes during a collision. The relative sizes and absolute sizes of the top and mid mounted airbag cushions are preferably in accordance with the values provided for the designs of FIGS. 7 and 8. The functional relationship between the top and mid mounted airbag cushions in FIG. 11 are also preferably in accordance with the relationships described for the airbags of FIGS. 7 and 8. For example, the upper airbag cushion 124 has a lower surface that comes close to or contacts an upper surface of the lower airbag cushion 113 along a line of contact J. The angular limitations described for the line of contact and the upper and lower surfaces of the airbag cushions in FIGS. 7 and 8 preferably also apply to the airbags of FIG. 11.

FIG. 12 shows another alternative embodiment of an airbag system 130 according to the present invention. This embodiment has basically the same features and benefits as the ones shown in FIGS. 8 and 11. The difference is that the second airbag is mounted between the positions shown in FIGS. 8 and 11. The second airbag 131 has a housing 132 mounted in the mid a portion of the instrument panel having similar height of the occupant's knees and deploys an airbag cushion 133 for direct contact with the torso, knees, and legs of the occupant. The airbag cushion 133 has a lower portion 134 which deploys into the empty space between the front of the occupant's lower legs 135 and the lower portion 136 of the instrument panel 137. As such, the airbag cushion 133 deploys into two empty spaces, one located in front of the occupant's lower torso 138 and the other in front of the occupant's lower legs 135. The airbag cushion 133 preferably includes a tether or membrane 140 that partially restricts gas flow from the lower portion 134 of the cushion 133 into the upper portion of the cushion 141. As shown, it is preferred that the inflator 142 be in fluid communication with portion of the airbag cushion 133 on the side of the membrane 140 closest to the lower portion 134. This can help the lower portion 134 of the cushion 133 deploy faster than the upper portion 141 of the cushion so that the lower portion can quickly deploy into the area in front of the occupant's lower legs before the gap between the lower legs and the lower part of the instrument panel surface closes during a collision. The relative sizes and absolute sizes of the top and mid mounted airbag cushions are preferably in accordance with the values provided for the designs of FIGS. 7, 8 and 11. The functional relationship between the top and mid mounted airbag cushions in FIG. 12 are also preferably in accordance with the relationships described for the airbags of FIGS. 7, 8 and 11. For example, the upper airbag cushion 144 has a lower surface that comes close to or contacts an upper surface of the lower airbag cushion 133 along a line of contact K. The angular limitations described for the line of contact and the upper and lower surfaces of the airbag cushions in FIGS. 7 and 8 preferably also apply to the airbags of FIG. 12. Further embodiments of the present invention may have the upper and/or lower airbag mounted in positions other than shown, such as having the upper airbag top mounted, mid-mounted or three quarter mounted and the lower airbag mounted anywhere below the upper airbag.

As will be clear to those of skill in the art, the herein-described embodiments of the present invention may be altered in various ways without departing from the scope or teaching of the present invention. It is the following claims, including all equivalents, which define the scope of the present invention.

We claim:

1. A passenger airbag system for an automotive vehicle having a passenger compartment, a windshield, and an instrument panel disposed between the passenger compartment and windshield, the instrument panel having a top portion adjacent the windshield, a lower portion with a surface that is generally directed toward the legs of an occupant in the passenger compartment and a mid portion with a surface that extends between the top portion and the lower portion, the passenger airbag system comprising:

a first airbag having a housing disposed in the instrument panel and an airbag cushion deployable from the housing through the instrument panel along a predetermined path for direct contact with the head and torso of an adult occupant sitting in the passenger compartment; and a second airbag having a housing disposed in the instrument panel and an airbag cushion deployable from the housing through the instrument panel along a predetermined path for direct contact with an occupant seated in the passenger compartment, the second airbag cushion having an upper portion for contacting the torso of the occupant and a lower portion after deployment that at least partially fills a space between the occupant's lower extremities and the lower portion of the instrument panel, the second airbag cushion further having a membrane separating the upper portion from the lower portion.

2. A passenger airbag system as set forth in claim 1, wherein the second airbag housing is disposed in the mid portion of the instrument panel.

3. A passenger airbag system as set forth in claim 2, wherein the first airbag housing is disposed in the top portion of the instrument panel.

4. A passenger airbag system as set forth in claim 2, wherein the mid portion of the instrument panel has a surface that is more vertical than horizontal.

5. A passenger airbag system as set forth in claim 1, wherein the second airbag housing is disposed in the lower portion of the instrument panel.

6. A passenger airbag system as set forth in claim 5, wherein the first airbag housing is disposed in the mid portion of the instrument panel.

7. A passenger airbag system as set forth in claim 1, wherein the lower portion of the second airbag cushion when deployed extends downwardly from the upper portion.

8. A passenger airbag system as set forth in claim 1, wherein the first airbag cushion when deployed has a lower surface and the second airbag cushion when deployed has an upper surface, the lower surface of the first airbag cushion and the upper surface of the second airbag cushion being generally adjacent to one another when deployed and defining a line of interface, the line of interface being in the range of plus 30 degrees to minus 30 degrees with respect to horizontal.

9. A passenger airbag system as set forth in claim 8, wherein the line of interface is in the range of plus 20 degrees to minus 0 decrees with respect to horizontal.

10. A passenger airbag system as set forth in claim 8, wherein the line of interface is in the range of plus 10 degrees to minus 10 degrees with respect to horizontal.

11. A passenger airbag system as set forth in claim 1, wherein the first airbag after deployment has a volume substantially larger than a volume of the upper portion of the second airbag.

12. A passenger airbag system as set forth in claim 11, wherein the first airbag after deployment has a volume at least 25 percent greater than the volume of the upper portion of the second airbag after deployment.

13. A passenger airbag system as set forth in claim 11, wherein the first airbag after deployment has a volume at least 50 percent greater than the volume of the upper portion of the second airbag after deployment.

14. A passenger airbag system as set forth in claim 11, wherein the first airbag after deployment has a volume between 60 and 120 liters.

15. A passenger airbag system as set forth in claim 11, wherein the upper portion of the second airbag after deployment has a volume between 30 and 70 liters and the lower portion of the second airbag after deployment has a volume between 10 and 30 liters.

16. A passenger airbag system for an automotive vehicle having a passenger compartment, a windshield, and an instrument panel disposed between the passenger compartment and the windshield, the instrument panel having a top portion adjacent the windshield, a lower portion with a surface that is generally directed toward the legs of an occupant in the passenger compartment and a mid portion with a surface that extends between the top portion and the lower portion, the passenger airbag system comprising:

a first airbag having a housing disposed in the instrument panel, the first airbag being deployable along a predetermined path for direct contact with an adult occupant sitting in the passenger compartment, the first airbag having a lower surface when deployed;

a second airbag having a housing disposed in the instrument panel, the second airbag being deployable along a predetermined path for direct contact with the torso of the adult occupant seated in the passenger compartment; and the second airbag further having an upper part that is disposed between the occupant's upper legs and the lower surface of the first airbag, and a lower part that is located between the occupant's knees or lower legs and the lower portion of the instrument panel.

17. A passenger airbag system as set forth in claim 16, wherein the first airbag after deployment has a volume substantially larger than a volume of the upper part of the second airbag.

18. A passenger airbag system as set forth in claim 17, wherein the first airbag after deployment has a volume at least 25 percent greater than the volume of the upper part of the second airbag after deployment.

19. A passenger airbag system as set forth in claim 17, wherein the first airbag after deployment has a volume at least 50 percent greater than the volume of the upper part of the second airbag after deployment.

* * * * *

UNITED STATES PATENT AND TRADEMARK OFFICE
CERTIFICATE OF CORRECTION

| | |
|---|---|
| PATENT NO. | : 7,731,229 B2 |
| APPLICATION NO. | : 11/748834 |
| DATED | : June 8, 2010 |
| INVENTOR(S) | : Seung-Jae Song et al. |

It is certified that error appears in the above-identified patent and that said Letters Patent is hereby corrected as shown below:

Column 8, line 9 - delete "FIG. 97" and insert --FIG. 9--
Column 11, line 43 - delete "0" and insert --20--

Signed and Sealed this

Thirtieth Day of November, 2010

David J. Kappos
*Director of the United States Patent and Trademark Office*